United States Patent
Yunoki et al.

(10) Patent No.: US 6,839,309 B1
(45) Date of Patent: Jan. 4, 2005

(54) RECORDING APPARATUS, REPRODUCING APPARATUS, RECORDING METHOD AND REPRODUCING METHOD

(75) Inventors: Hirotomo Yunoki, Chiba (JP); Atsushi Kitamura, Tokyo (JP); Atsushi Amano, Kanagawa (JP)

(73) Assignee: Sony Corporation, Tokyo (JP)

( * ) Notice: Subject to any disclaimer, the term of this patent is extended or adjusted under 35 U.S.C. 154(b) by 570 days.

(21) Appl. No.: 09/603,092

(22) Filed: Jun. 26, 2000

(30) Foreign Application Priority Data

Jun. 29, 1999 (JP) .......................................... P11-183822
Jun. 12, 2000 (JP) .......................................... 2000-175978

(51) Int. Cl.[7] ................................................ G11B 7/00
(52) U.S. Cl. .................................. 369/47.33; 369/53.31
(58) Field of Search .......................... 369/47.32, 47.33, 369/47.34, 47.35, 47.36, 53.11, 53.31, 53.43, 53.44, 53.45, 59.17, 59.19, 59.2, 124.15, 116, 44.17, 44.18

(56) References Cited

U.S. PATENT DOCUMENTS

| | | | | |
|---|---|---|---|---|
| 5,504,728 A | * | 4/1996 | Yokota et al. ............ | 369/53.24 |
| 5,574,710 A | * | 11/1996 | Kimura et al. ........... | 369/47.32 |
| 5,673,242 A | * | 9/1997 | Lin .......................... | 369/53.37 |
| 5,699,336 A | * | 12/1997 | Maeda et al. ............ | 369/53.18 |
| 5,768,231 A | * | 6/1998 | Sagata ..................... | 369/47.48 |
| 5,808,978 A | * | 9/1998 | Wang et al. ............. | 369/44.28 |
| 5,970,208 A | * | 10/1999 | Shim ..................... | 369/124.04 |
| 6,147,467 A | * | 11/2000 | Yu et al. .................. | 369/44.29 |
| 6,269,061 B1 | * | 7/2001 | Shimizume et al. ....... | 369/47.3 |
| 6,496,456 B2 | * | 12/2002 | Ueki ....................... | 369/47.33 |

FOREIGN PATENT DOCUMENTS

JP                10340518 A    * 12/1998    ........... G11B/19/00

* cited by examiner

*Primary Examiner*—Thang V. Tran
*Assistant Examiner*—Bach Vuong
(74) *Attorney, Agent, or Firm*—Oblon, Spivak, McClelland, Maier & Neustadt, P.C.

(57) ABSTRACT

An object of this invention is to provide a recording apparatus, reproducing apparatus, recording method and reproducing method for recording or reproducing data in/from a recording medium while the recording medium is rotating by inertia after a rotation thereof by driving is stopped.

12 Claims, 8 Drawing Sheets

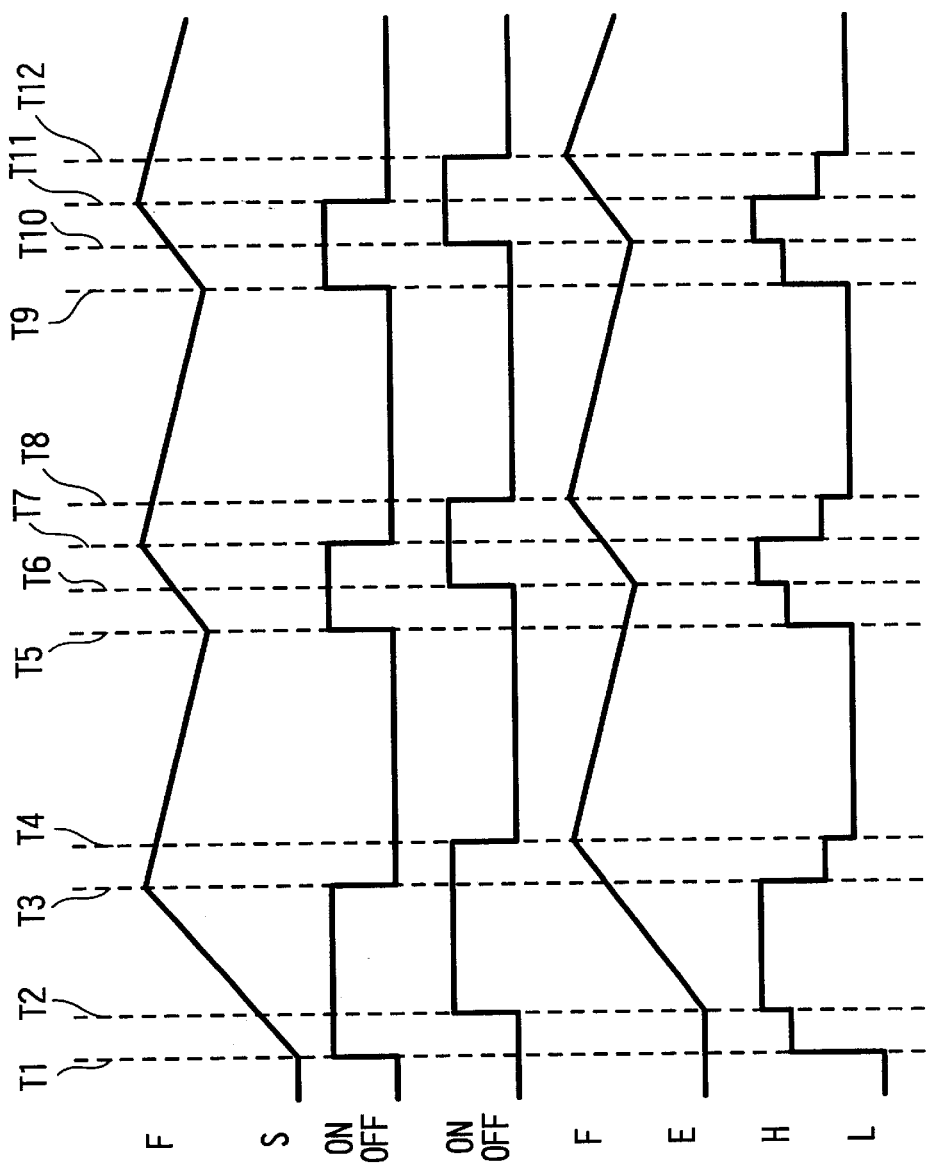

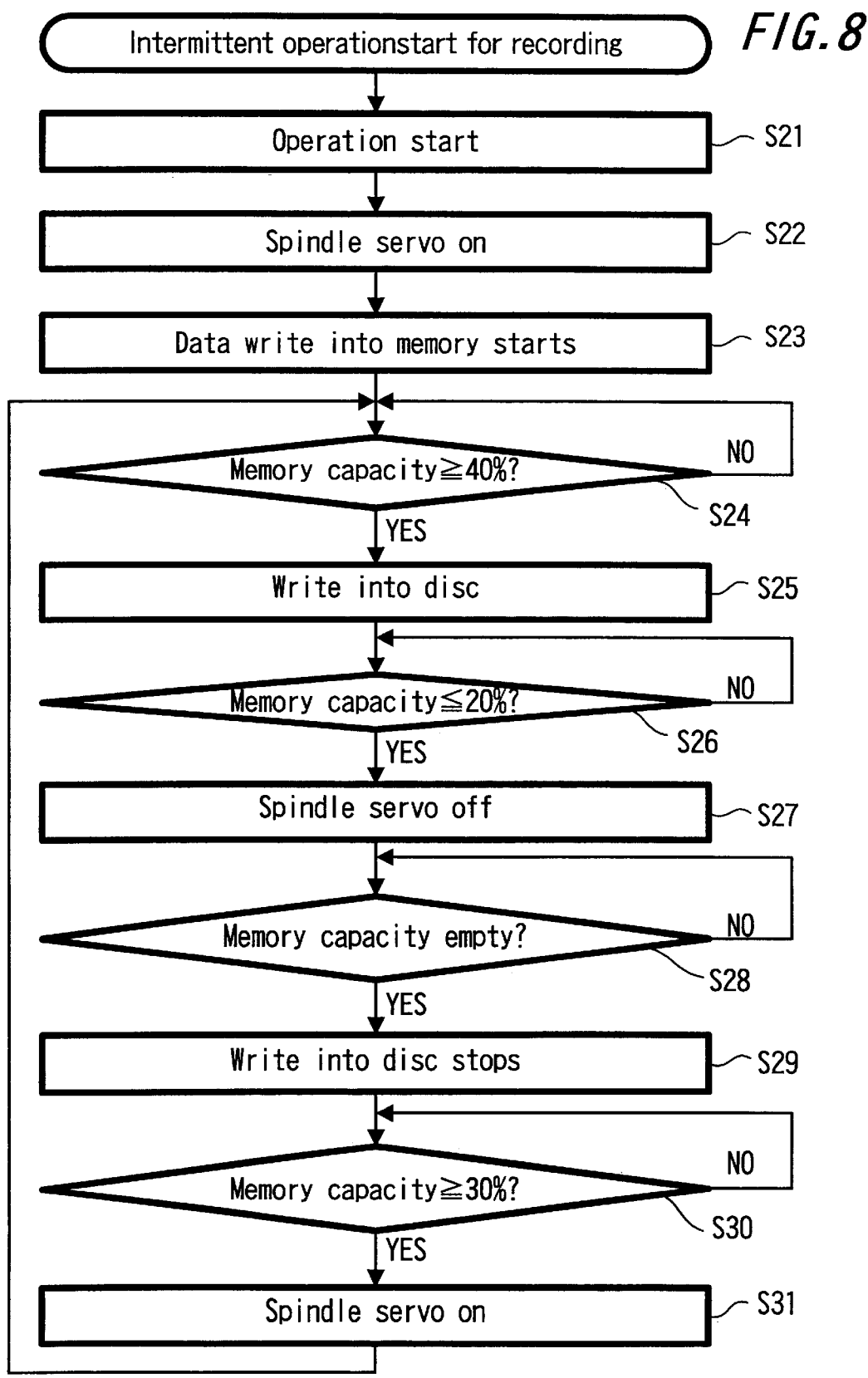

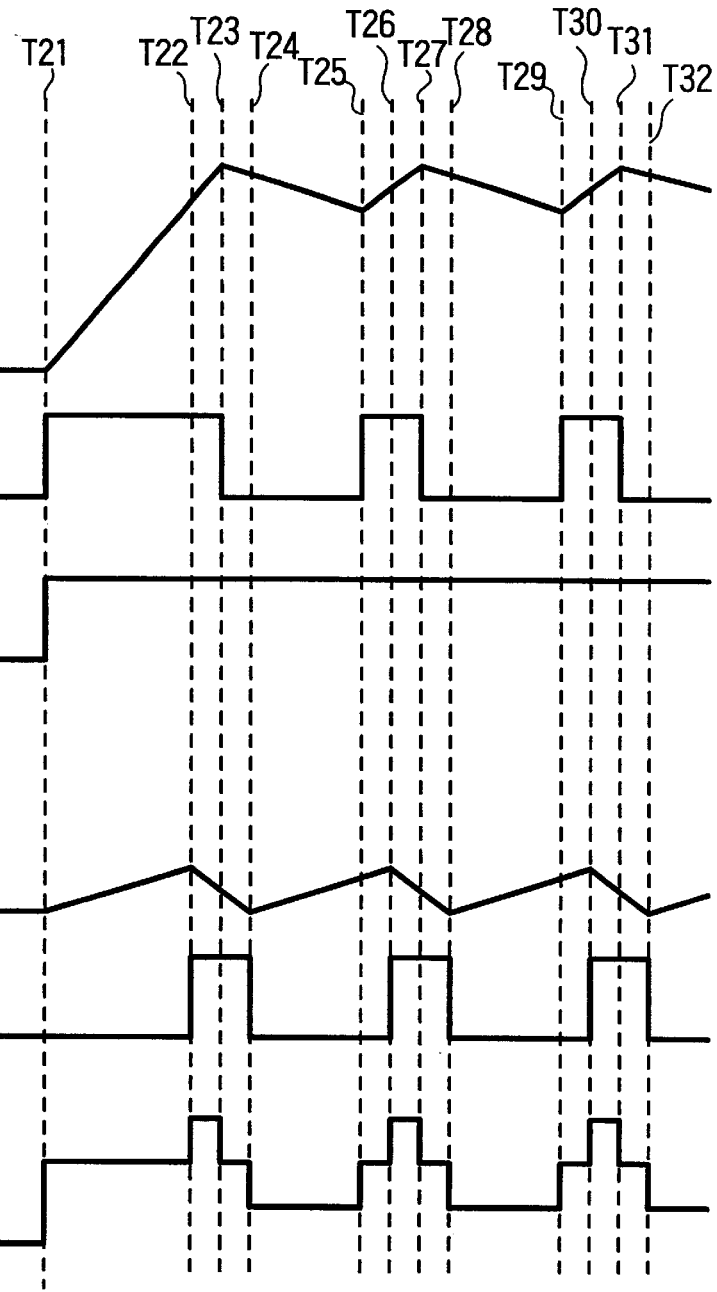

RECORDING APPARATUS, REPRODUCING APPARATUS, RECORDING METHOD AND REPRODUCING METHOD

BACKGROUND OF THE INVENTION

1. Field of the Invention

The present invention relates generally to a recording apparatus, reproducing apparatus, recording method and reproducing method in which upon recording or reproducing data by rotating a recording medium, data is recorded or reproduced at least during an inertial rotation of the recording medium after the control of the rotation thereof is interrupted based on data amount for recording or reproducing.

2. Description of the Related Art

According to a conventional technology, in order to prevent an interruption of reproduction of audio data due to an interruption of reading of the audio data from a recording medium which is caused by vibration or the like during reproduction of the audio data recorded in the recording medium, for example, a spindle motor is rotated at a higher speed than a rotation speed necessary for ordinary reproduction so as to reproduce the audio data more rapidly than the reproduction speed usually necessary for the reproduction. Then, audio data processed by a signal processing portion is stored in a buffer RAM temporarily from RAM (random access memory) controller and even if reading of the audio data from the recording medium is interrupted due to vibration or the like, the data is read continuously from the buffer RAM at a predetermined speed under a control of a microcomputer.

According to the conventional technology for preventing an interruption of reproduction of audio data due to vibration or the like, the audio data is reproduced from the recording medium rapidly by rotating the spindle motor at a high speed and written into the buffer RAM. If data remaining in the buffer RAM becomes short, new data is written therein each time. Thus, if the buffer RAM is full, the microcomputer has to interrupt write of the audio data by the RAM controller and change into a pose operation or the like. However, during such a pose operation, the spindle motor remains in a rotating condition, laser beam from an optical pickup remains irradiated to an optical disc and further, PLL (phase locked loop) of the servo system is kept locked. Thus, there is such a disadvantage that power consumption increases by an amount corresponding to power consumption by the pose operation as compared to ordinary rotating operation time.

If acceleration of the spindle motor and write into the buffer RAM are controlled at the same timing, write into the buffer RAM is disabled except when the spindle motor is accelerated. Thus, there is another disadvantage that it takes long to write into the buffer RAM.

In a conventional servo system PLL shown in FIG. 1, an output of the RFCK (read frame clock) 47 based on a stabilized frequency from a crystal oscillator 41 and an output of the WFCK (write frame clock) 48 generated from a rotation of a disc 40 are compared each other by a phase comparator 49. This result is called phase measurement 50, and phase measurement 50 and period measurement 51 are mixed to produce a disc speed control signal through a speed/phase changeover 52. This disc speed control signal is inputted for disc drive to control a disc speed. Before the above described control system is actuated, a disc rotation speed is controlled to near a predetermined value depending on a disc speed control output outputted by the speed/phase changeover 52 based on a result of measurement of the rotation speed of the disc 40 by the speed measurement 46. A clock for use in a signal processing block 53 is applied after processing an output of the crystal oscillator 41 by a signal processing reference clock generating circuit 45. As a result, only when the frequency of a signal reproduced from a recording medium is within a capture range which is a limited frequency range around 4.3218 MHz as shown in FIG. 2, a reference clock generated from the crystal vibrator can be processed. Consequently, there is such a problem that a strict speed control is necessary to drive the recording medium.

Accordingly, the present invention has been achieved in views of the above described problems and an object of the invention is to provide a recording apparatus and a reproducing apparatus capable of saving electric power when preventing an interruption of reproduction of audio data due to vibration or the like.

SUMMARY OF THE INVENTION

To achieve the above object, according to a first aspect of the present invention, there is provided a reproducing apparatus for reproducing by reading data from a recording medium: a driving means for driving the recording medium; a reproducing means for reproducing data from the recording medium; a memory means for memorizing reproduced data by the reproducing means temporarily; a memory control means for reading data memorized in the memory means at a first speed and memorizing data reproduced by the reproducing means intermittently in the memory means at a second speed higher than the first speed; and a control means for after a predetermined amount of data is read out from the recording medium, controlling the driving means so as to interrupt a drive of the recording medium by the driving means, controlling the reproducing means to reproduce data from the recording medium at least during an inertial rotation of the recording medium, and controlling the memory control means to memorize data in the memory means.

Further, according to a second aspect of the present invention, there is provided a recording apparatus for recording data in a recording medium comprising: a driving means for driving the recording medium; a recording means for recording data in the recording medium; a memory means for memorizing data to be recorded in the recording medium by the recording means temporarily; a memory control means for writing data to be recorded in the recording medium into the memory means at a first speed and reading data to be recorded in the recording medium by the recording means from the memory means intermittently at a second speed higher than the first speed; and a control means for after a predetermined amount of data is written into the memory means, controlling the driving means so as to interrupt a drive of the recording medium by the driving means, controlling the memory control means to read data from the memory means at least during an inertial rotation of the recording medium, and controlling the recording means to record data read from the memory means to the recording medium.

Further, according to a third aspect of the present invention, there is provided a reproducing method for reproducing be recorded in a recording medium, comprising steps of: controlling a recording medium to rotate; reading data intermittently from the recording medium at a first speed until a predetermined amount thereof is exceeded to memorize the data temporarily and fetching out the data memorized temporarily at a second speed lower than the first speed for reproduction; interrupting a control on the rotation of the recording medium if data read from the recording medium exceeds a predetermined amount; and reading data from the recording medium intermittently at a third speed during an inertial rotation of the recording medium to memorize the data temporarily and fetching out the data memorized temporarily at a second speed lower than the third speed for reproduction.

Further, according to a fourth aspect of the present invention, there is provided a recording method for recording data in a recording medium, comprising: controlling a recording medium to rotate and storing data to be recorded in the recording medium temporarily until a predetermined amount thereof is reached; if the stored data reaches a predetermined amount, writing the data stored temporarily into the recording medium by the predetermined amount; if the predetermined amount of data is written into the recording medium, interrupting a control of the rotation of the recording medium; and after the control on the rotation of the recording medium is interrupted, recording the data stored temporarily into the recording medium at least during an inertial rotation of the recording medium.

BRIEF DESCRIPTION OF THE DRAWINGS

FIG. 7A shows a rotation speed in the time chart indicating the intermittent operation during reproduction of the embodiment of the present invention;

FIG. 7B shows a spindle servo in the time chart indicating the intermittent operation during reproduction of the embodiment of the present invention;

FIG. 7C shows data write operation into a memory. in the time chart indicating the intermittent operation during reproduction of the embodiment of the present invention;

FIG. 7D shows memory capacity in the time chart indicating the intermittent operation during reproduction of the embodiment of the present invention;

FIG. 7E shows power consumption in the time chart indicating the intermittent operation during reproduction of the embodiment of the present invention;

FIG. 8 is a flow chart showing the intermittent operation during recording of the embodiment of the present invention;

FIG. 9A shows a rotation speed in the time chart indicating the intermittent operation during recording of the embodiment of the present invention;

FIG. 9B shows a spindle servo in the time chart indicating the intermittent operation during recording of the embodiment of the present invention;

FIG. 9C shows data write operation into a memory in the time chart indicating the intermittent operation during recording of the embodiment of the present invention;

FIG. 9D shows memory capacity in the time chart indicating the intermittent operation during recording of the embodiment of the present invention;

FIG. 9E shows data write operation into a disc in the time chart indicating the intermittent operation during recording of the embodiment of the present invention; and FIG. 9F shows power consumption in the time chart indicating the intermittent operation during recording of the embodiment of the present invention.

DETAILED DESCRIPTION OF THE PREFERRED EMBODIMENTS

Hereinafter, the preferred embodiments of the present invention will be described in detail with reference to the accompanying drawings. This embodiment is a recording/reproducing apparatus which employs an photomagnetic disc as a recording medium.

Figure 3:
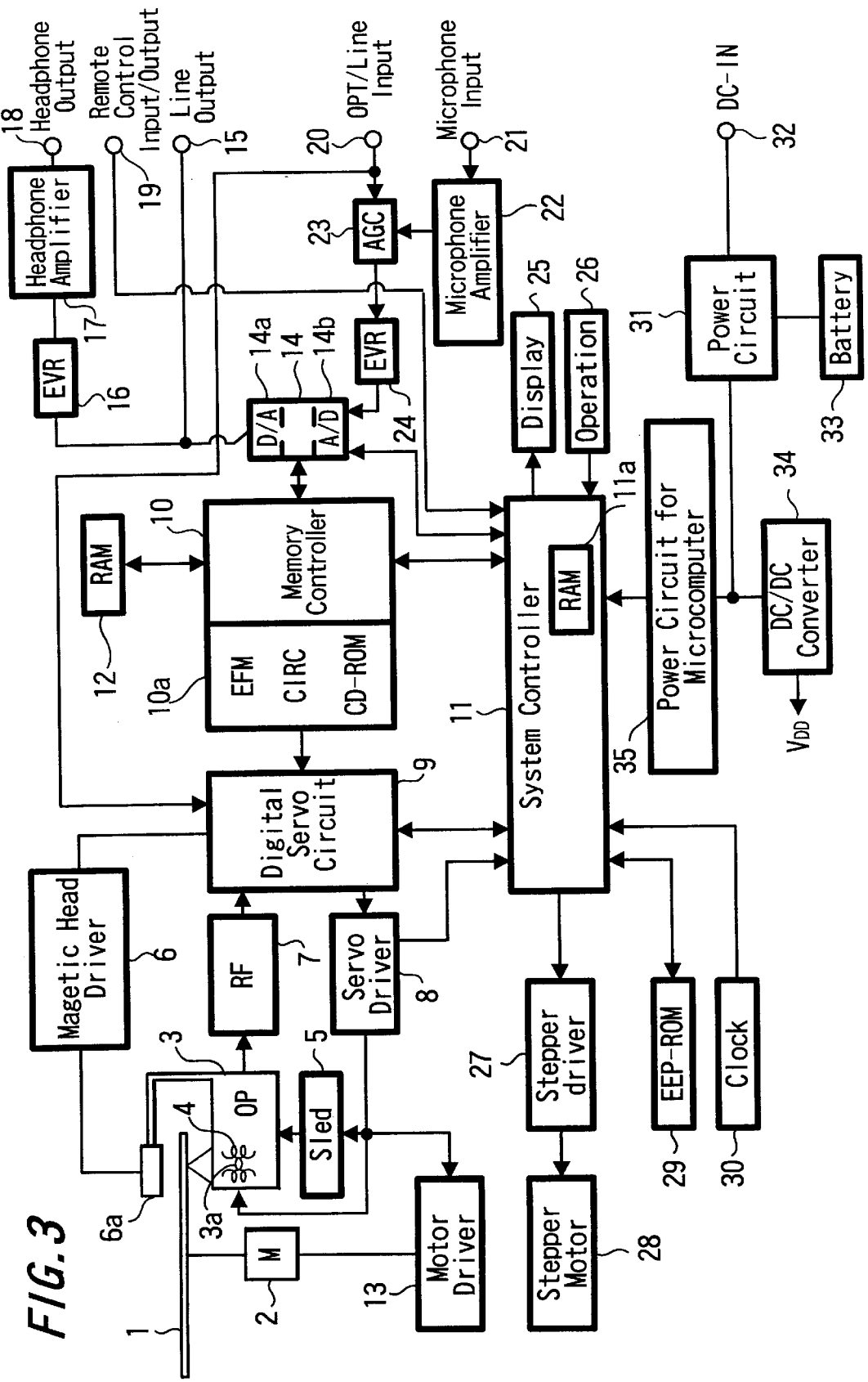
FIG. 3 is a block diagram showing a structure of a recording/reproducing apparatus of an embodiment of the present invention.

As shown in FIG. 3, the recording/reproducing apparatus of this embodiment comprises: a photomagnetic disc 1 on which audio data is recorded; a spindle motor 2 for driving a rotation of the photomagnetic disc 1; an optical pickup 3 for irradiating the photomagnetic disc 1 with laser beam for recording or reproduction through an objective lens 3a; a magnetic head driver 6 for generating a signal for modulating a magnetic field based on recording data during recording; a magnetic head 6a for applying a modulated magnetic field to the photomagnetic disc 1; a RF amplifier 7 for detecting a reflection signal from the photomagnetic disc 1 from laser beams irradiated by the optical pickup 3 and generating RF signal, focus servo signal, tracking servo signal and spindle servo signal through amplification by addition or subtraction so as to enable a subsequent signal processing; a digital servo circuit 9 for generating various servo drive signals based on the focus servo signal, tracking servo signal, and spindle servo signal generated by the RF amplifier 7; a servo driver 8 for driving the spindle motor 2 by driving a focus coil and tracking coil of an two-axis actuator 4 of the optical pickup 3 and driving a sled mechanism 5; and a motor driver 13 for generating a spindle error signal corresponding to PWM (pulse width modulation) signal.

Further, the recording/reproducing apparatus of this embodiment includes an encoder/decoder portion 10a of a signal processing portion for carrying out EFM (8–14 modulation) decoding, CIRC (cross interleave reed solomon code) processing, and CD-ROM decoding on the RF signal by extracting a clock from the RF signal generated by the RF amplifier 7, a memory controller 10 for controlling write and read of data subjected to signal processing by the signal processing portion into/from the buffer RAM 12, and a buffer RAM 12 for storing data reproduced at a high speed temporarily so as to read out at a predetermined rate.

Further, in the recording/reproducing apparatus of this embodiment, its reproducing system comprises a D/A converter 14a for converting data read from the buffer RAM 12 to analog signal, a line output terminal 15 enabling line output of an analog signal, an electronic volume 16 and headphone amplifier 17 for amplifying the converted analog signal, and an output terminal 18 for outputting an audio signal to outside. The recording system comprises a light/line input terminal 20 and microphone input terminal 21 to which the audio signal is to be inputted, a microphone amplifier 22 for amplifying the audio signal, AGC (automatic gain control) circuit 23 for automatically controlling a gain of the audio signal, an electronic volume 24 for amplifying the audio signal controlled in its gain and an A/D converter 14b for converting the amplified audio signal to digital data.

Further, the recording/reproducing apparatus of this embodiment comprises a system controller 11 for supplying a control signal to the digital servo circuit 9 and memory control circuit 10 so as to control the operations thereof, a RAM 11a which is a work memory of the system controller 11, a display portion 25 for displaying an operation mode, reproduction track number and the like, a control portion 26 enabling input of instructions of operation and the like and a remote control input/output terminal 19 capable of inputting or outputting a signal form the remote controller.

Further, the recording/reproduction apparatus of this embodiment comprises a stepper motor 28 for lifting up and down the magnetic head 6a, a stepper driver 27 for supplying a drive signal to the stepper motor 28, EEP-ROM (electrically erasable and programmable read-only-memory) 29 for holding various servo coefficients of digital servo system, a clock 30, a direct current input terminal 32 to which DC voltage can be supplied, a power circuit 31 for supplying an operating power voltage, a battery 33 accommodated as a power supply, a DC/DC converter 34 for outputting an operating power voltage VDD and a microcomputer power circuit 35 for supplying a power voltage for the microcomputer.

For the reproduction, the above mentioned recording/reproducing apparatus comprises the following means.

The photomagnetic disc 1 forms a disc like recording medium and the optical pickup 3 forms a reproducing means for reproducing digital data recorded in the disc like recording medium.

The buffer RAM 12 forms a memory means for accumulating digital data reproduced by a reproducing means.

The memory controller 10 forms a memory control means for reading digital data accumulated in the memory means at a first speed and writing digital data reproduced by the reproducing means intermittently into the memory means at a speed higher than the first speed.

The spindle motor 2 forms a rotating means for rotating the disc like recording medium.

The system controller 11 forms a control means which so controls to at least keep inertial rotation of the rotating means after the memory control means stops a write of digital data reproduced from the reproducing means into the memory means, and when the memory control means restarts writing of digital data reproduced from the reproducing means into the memory means, restarts the rotation of the rotating means and then restarts the writing into the memory means.

Further, the system controller 11 forms a control means which so controls to start or stop a write into the memory means after rotating the rotating means through inertia at least either when the memory control means starts or stops a write of digital data reproduced from the reproducing means into the memory means.

For recording, the above described recording/reproducing apparatus comprises the following means.

The buffer RAM 12 forms a memory means for storing inputted digital data temporarily.

The memory controller 10 forms a memory control means which writes digital data accumulated in the memory means at a fixed speed and reads the digital data accumulated in the memory means intermittently at a speed higher than the fixed speed.

Further, the spindle motor 2 forms a rotating means for rotating the disc like recording medium.

The optical pickup 3 and magnetic head 6a form a recording means for recording digital data read. out intermittently from the memory means into the disc like recording medium.

The system controller 11 forms a control means which at least rotates the rotating means through inertia after the memory control means stops reading of digital data from the memory means, and when the memory control means restarts reading of digital data from the memory means, restarts the rotation of the rotating means and then restarts the reading from the memory means.

Figure 5:
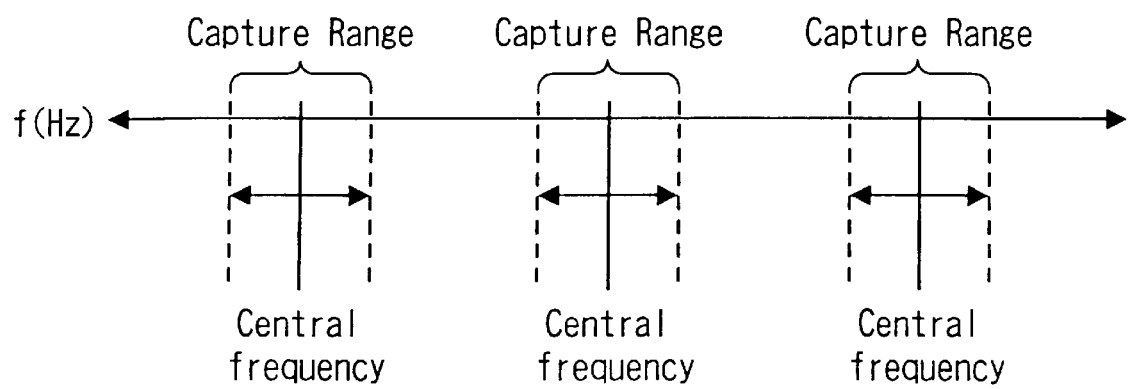
FIG. 5 is a diagram for explaining an operation of the PLL portion of the embodiment of the present invention.

The servo system PLL of this embodiment having such a structure will be described with reference to FIGS. 4, 5.

Figure 4:
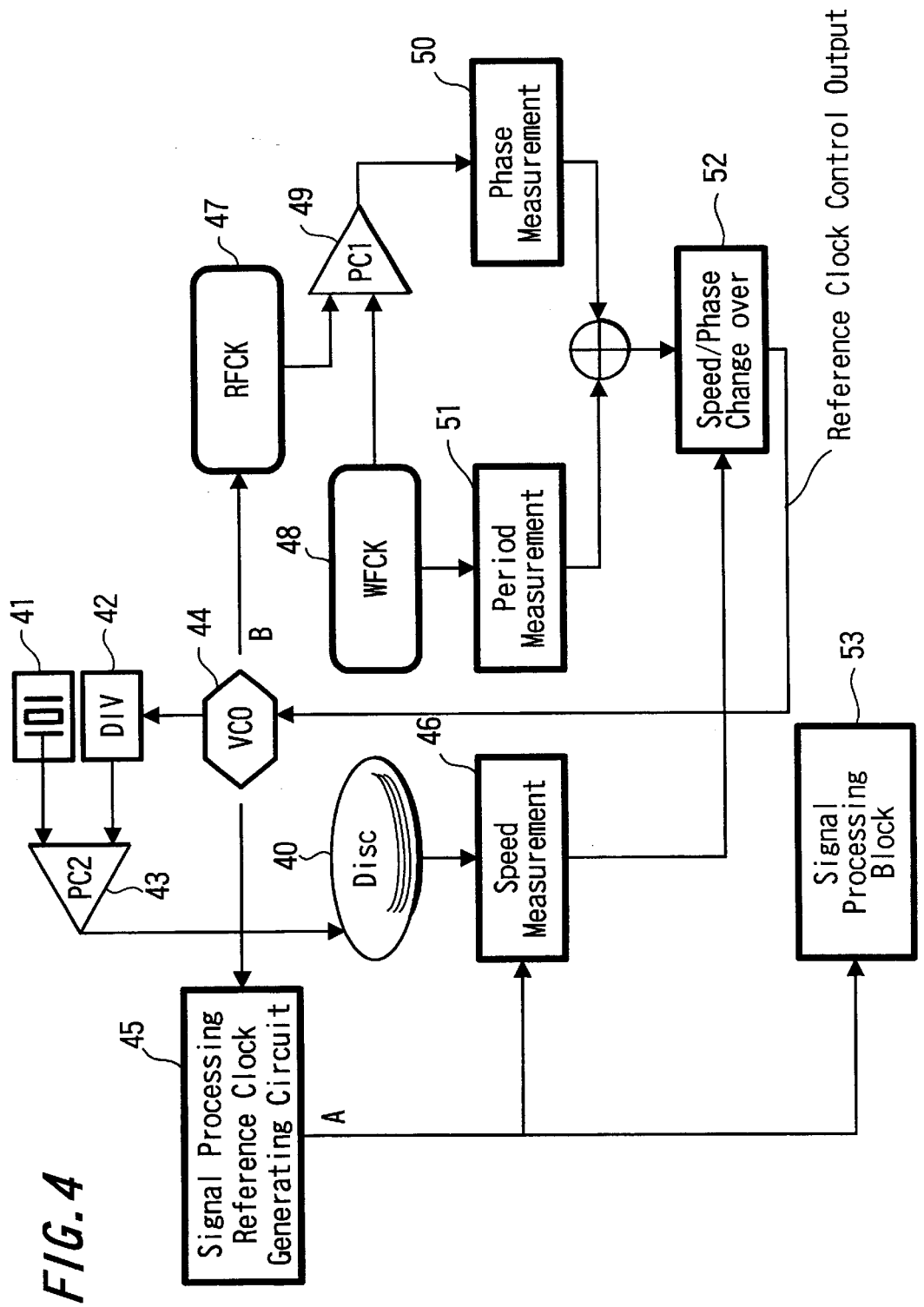
FIG. 4 is a block diagram of the PLL portion of the embodiment of the present invention.

In FIG. 4, a crystal vibrator 41 generates a stabilized frequency clock. With reference to this clock signal, the rotation of the disc 40 is controlled and a rotation speed is measured by speed measurement 46. Then, a measuring signal is inputted to VCO (voltage control oscillator) 44 through speed/phase changeover 52 and a frequency signal corresponding to the measuring signal is outputted. A reference clock outputted from the VCO 44 is divided by a DIV (divider) 42 at a predetermined dividing ratio to turn to a loop subjected to phase comparison with the abovementioned crystal vibrator 41 in PC2 (phase comparator). Meanwhile, the dividing ratio in the DIV 42 is supplied separately by the control circuit or the like.

The reference clock outputted from the VCO 44 is inputted to the RFCK 47 and the phase is compared with the WFCK 48 by a phase comparator 49. This result is called phase measurement 50 and mixed with a result of period measurement 51 of the disc 40 sent from the WFCK 48 so as to select a signal for controlling the VCO 44 by speed/phase changeover 52.

Further, a clock for use in a signal processing block 53 is generated from the reference clock of the VCO 44 by a signal processing reference clock generation circuit 45.

Figure 1:
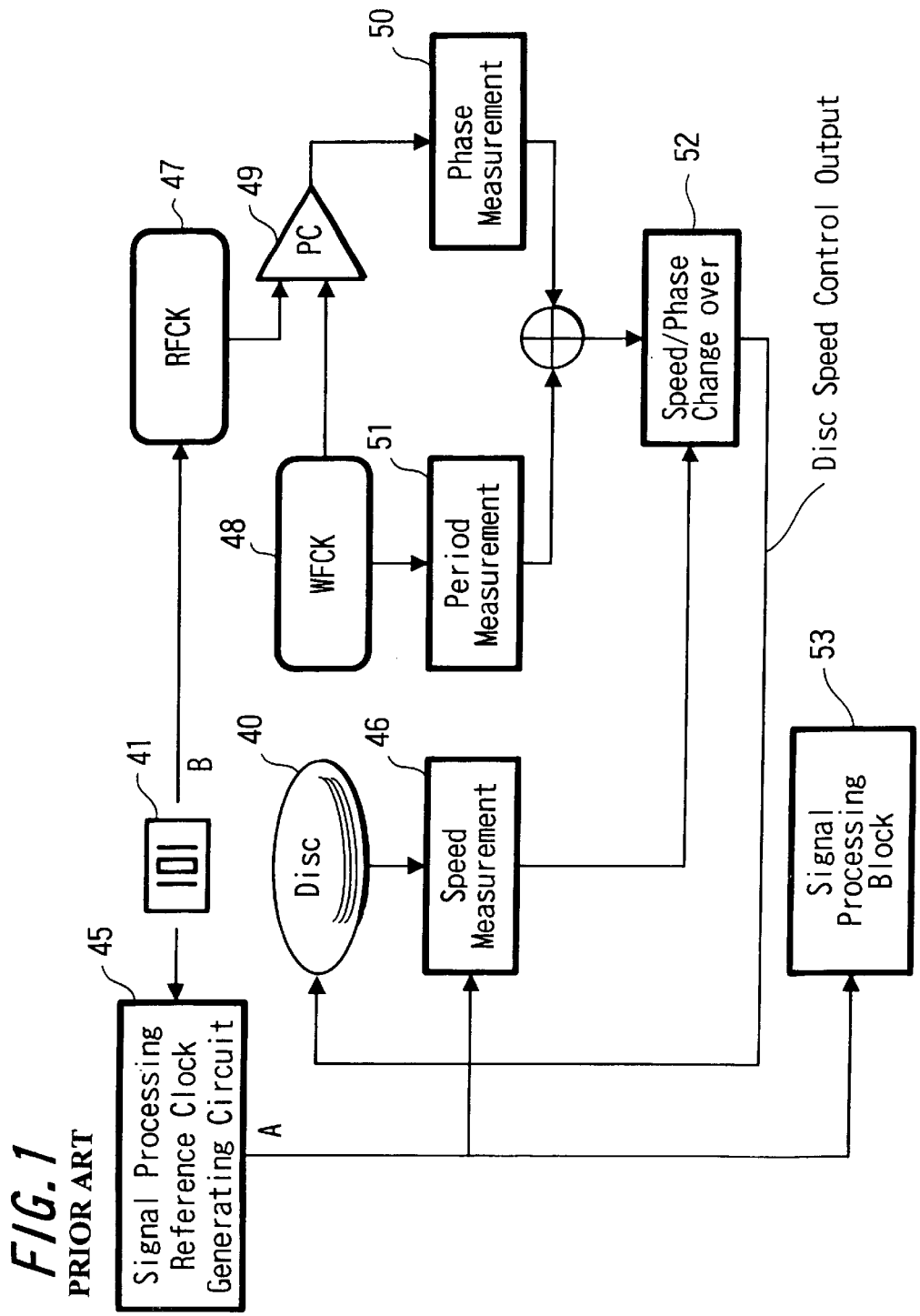
FIG. 1 is a block diagram showing a PLL portion of a conventional example.
Figure 2:
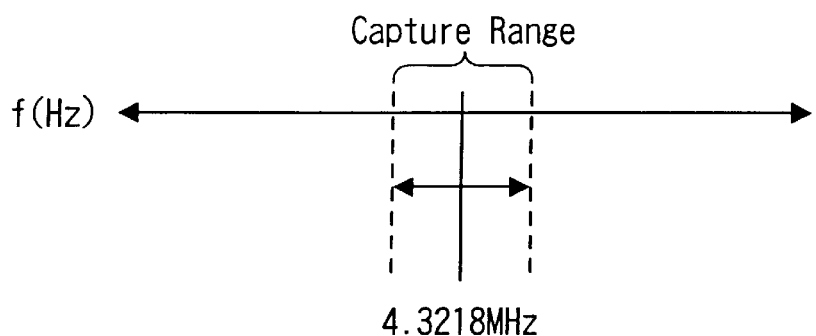
FIG. 2 is a diagram showing an operation of the conventional PLL portion.

An operation of the PLL control under a structure shown in FIG. 4 will be described with reference to FIG. 5. Because in.the conventional example, an output of the crystal vibrator 41, which outputs a fixed frequency as shown in FIG. 1 and FIG. 2, is employed as a reference clock, a range which the PLL control circuit can control is limited to a capture range near a central frequency obtained from the crystal vibrator 41. On the contrary, the PLL control circuit shown in FIG. 4 employs a variable frequency from the VCO 44 as the reference clock. Thus, the central frequency in FIG. 2 moves as shown in FIG. 5 and each central frequency has a capture range having a predetermined frequency range. Because signal processing is carried out on the central frequency located at any position, the signal processing is enabled substantially in a frequency range which the VCO 44 is capable of oscillating. Further because the disc 40 is controlled by the same VCO 44, the PLL control is enabled in a wide range without depending on the fixed frequency of the crystal vibrator 41. Such PLL is called wide PLL.

An operation of the recording/reproducing apparatus of this embodiment including a PLL control circuit having such a structure will be described below. First, an operation for reproduction will be described.

Referring to FIG. 3, a signal recorded in the photomagnetic disc 1 is read by irradiating with laser beam having read power from the optical pickup 3 and then converted to a RF signal through the RF amplifier 7. The RF signal is subjected to EFM decoding, error correcting processing and the like by the signal processing portion 10a and audio data output which is its main data is stored in the buffer RAM 12 through the memory controller 10. As described later, data write into the buffer RAM 12 is so controlled to be carried out intermittently corresponding to spindle servo and memory capacity.

A data transmission rate up to here is a rate higher than a final continuous reproduction output by controlling the rotation of the spindle motor 2 based on a drive signal sent from the digital servo circuit 9. It is assumed that write of reproduced audio data into the buffer RAM 12 is carried out intermittently at a rate higher than the final continuous reproduction output by a variable speed rotation means which rotates the disc 1 at a higher speed than its normal rotation.

Audio data stored in the buffer RAM 12 is read out by the memory controller 10 at a ordinary reproduction rate, converted to an analog signal by the D/A converter 14a and amplified by the electronic volume 16 and headphone amplifier 17 so as to produce audio output.

Here, an intermittent operation for data write into the buffer RAM for reproduction according to this embodiment will be described using a flow chart of FIG. 6 and a timing chart of FIG. 7.

Figure 6:
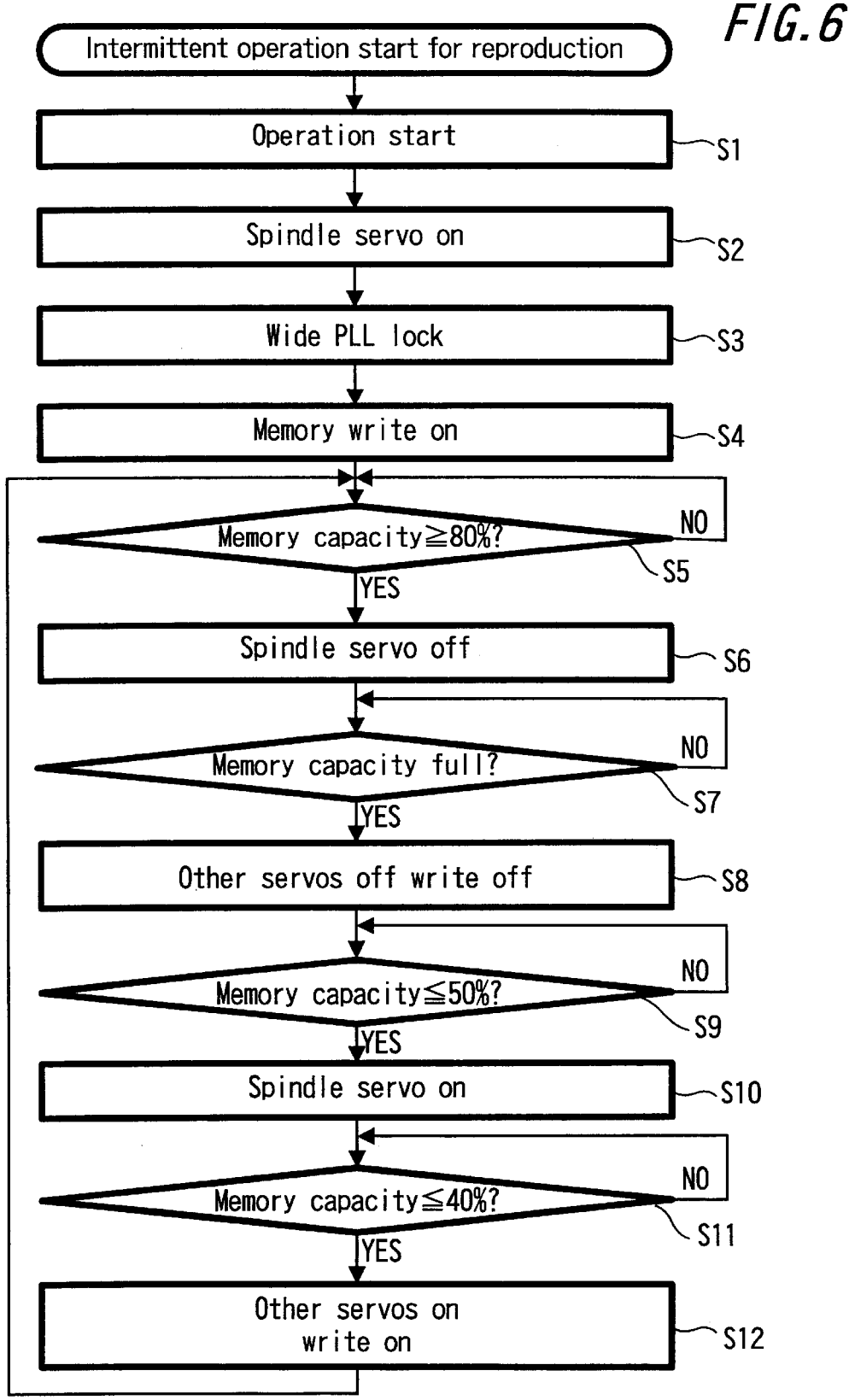
FIG. 6 is a flow chart showing an intermittent operation during reproduction of the embodiment of the present invention.

In FIG. 6, reproducing operation is started in step S1. More specifically, the photomagnetic disc 1 is irradiated with laser beam having a read power by the optical pickup 2. A reflected light is detected by a photo detector and a reproduction RF signal is outputted from the RF amplifier 7. Meanwhile, the laser beam having read power is laser output of a relatively low level for detecting data from the reflected light based on magnetic Kerr effect.

Spindle servo is turned on in step S2 to start servo. More specifically, the digital servo circuit 9 generates a drive signal for turning on the spindle servo according to rotation speed detection information of the spindle motor 2 supplied from the system controller 11 at time T1 and supplies, for example, PWM signal to the servo driver 8. The servo driver 8 supplies an electric power corresponding to the PWM signal as the spindle error signal to the motor driver 13. The motor driver 13 generates a drive signal based on the spindle-error signal so as to start servo control on the spindle motor speed. In this case, the spindle motor 2 is controlled to rotate at higher speeds than normal mode.

In step S3, the wide PLL is locked. More specifically, in the digital servo circuit 9, reproduction clock is extracted from edge detection of the reproduction RF signal by means of the PLL circuit. At this time, the PLL circuit is so controlled that edge detection of the reproduction RF signal is carried out in a wider lock range than a conventional lock range to follow up a rotation speed of the photomagnetic disc 1. This mode is called wide capture mode and the lock range of the PLL circuit is actuated in multiple stages, for example, so that the rotation speed of the photomagnetic disc 1 can be followed up from 0.5 times to 3.5 times.

In step S4, memory write is turned on so as to execute write. More specifically, the system controller 11 sends a data write control signal to the buffer RAM 12 under a control of the memory controller 10 at time T2. According to this control signal, the memory controller 10 carries out data write into the buffer RAM 12.

In step S5, whether or not the memory capacity exceeds 80% is determined. More specifically, at time T3(T7, T11), the memory controller recognizes that the memory capacity of the system controller is over 80% according to an address number or write pointer at which data write into the buffer RAM 12 corresponding to an address number of maximum memory capacity was carried out.

If in step S5, the memory capacity is over 80%, the processing proceeds to step S6. In step S6, the spindle servo is turned off or the servo is stopped. More specifically, at time T3 (T7, T11), the digital servo circuit 9 stops a drive signal for turning off the spindle servo according to rotation speed detection information of the spindle motor 2 supplied from the system controller 11. The servo driver 8 stops a supply of power to the motor driver 13 depending on the PWM signal as a spindle error signal. The motor driver 13 stops the drive signal based on the spindle error signal so as to stop servo control on the spindle motor. In this case, the spindle motor 2 is so controlled to rotate through inertia at a rotation speed slightly lower than a high speed rotation of the spindle motor 2 up to time T3–T5(T7–T9).

In step S7, whether or not the memory capacity is full is determined. More specifically, at time T4(T8, T12), the memory controller recognizes that the memory capacity of the system controller 11 is full according to an address number (write pointer position) at which data write into the buffer RAM 12 corresponding to an address number of maximum memory capacity was carried out.

If the memory capacity is full in step S7, the processing proceeds to step S8. In step S8, the other servos are turned off or the servos are stopped so as to disable write. More specifically, the digital servo circuit 9 stops a drive signal for turning off focus servo and tracking servo of the two-axis actuator 4 supplied from the system controller 11. The two-axis actuator 4 stops servo control based on the focus error signal and tracking error signal. At time T4(T8, T12), the system controller 11 sends a control signal for stopping data write into the buffer RAM 12 by the memory controller 10. According to this write stop control signal, the memory controller 10 stops data write into the buffer RAM 12.

In step S9, whether or not the memory capacity is 50% is determined. More specifically, at time T5(T9), the memory controller 10 recognizes that the memory capacity of the system controller 11 is 50% according to an address number at which data write into the buffer RAM 12 corresponding to an address number of maximum memory capacity was carried out. If the memory capacity is 50% in step S9, the processing proceeds to step S10. In step S10, the spindle servo is turned on so as to restart the servo. More specifically, at time T5(T9), the digital servo circuit 9 turns on the spindle servo according to the rotation speed detection information of the spindle motor 2 supplied from the system controller 11 so as to generate a drive signal for restarting the servo and supply it to the servo driver 8 as for example, the PWM signal. The servo driver 8 supplies an electric power corresponding to the PWM signal as the spindle error signal to the motor driver 13. The motor driver 13 turns on the spindle servo based on the spindle error signal so as to generate a drive signal for restarting the servo. Consequently, servo control on the spindle motor speed is started. In this case, the spindle motor 2 is so controlled from T5 to rotate at a higher speed than that during an inertial rotation to T3–T5(T7–T9).

In step S11, whether or not the memory capacity is 40% is determined. More specifically, at time T6(T10), the memory controller 10 recognizes that the memory capacity of the system controller 11 is 40% according to an address number at which data write into the buffer RAM 12 corresponding to an address number of maximum memory capacity was carried out.

If in step S11, the memory capacity is 40%, the processing proceeds to step S12. In step S12, the other servos are turned on for restart and then write is turned on so as to restart the write. More specifically, the digital servo circuit 9 turns on the focus servo and tracking servo by the two-axis actuator 4 from the system controller 11 and supplies a drive signal for restarting the servo to the servo driver 8. The servo driver 8 supplies an electric power corresponding to the focus error signal and tracking error signal to the two-axis actuator 4. At time T6(T10), the system controller 11 sends a control signal for data write by the memory controller 10 into the buffer RAM 12. According to this write control signal, the memory controller 10 restarts data write into the buffer RAM 12. Then, the processing returns to step S5 and processings and determinations from step S5 to step S12 are repeated until the reproducing operation is finished.

Operations at T7–T12 are the same as those in the above described step S5–S12. Therefore, corresponding processing and determination are indicated in the parentheses.

When the spindle motor 2 is accelerated, data write is started at some rotation speed. After the acceleration is stopped, the spindle motor 2 is rotated through inertia. Thus, because data can be read while the spindle motor is rotating through inertia for reproduction at a variable speed, it is so controlled that data reading period is shortened and data write is continued during the inertial rotation also and then the data write into the buffer RAM 12 is stopped slightly later than when the acceleration is stopped. Meanwhile, some rotation speed refers to a speed which enables effective reproduction of data for a short time.

As described above, during the intermittent operation for reproduction, data stored in the buffer RAM 12 is used and if data storage becomes short, the spindle motor 2 is accelerated to so control that write condition is gained when the rotation speed is the fastest. By repeating this operation, interruption of reproduction data due to vibration or the like is prevented so as to achieve energy saving.

Then, an operation for record will be described. If audio signal is inputted from the light/line input terminal 20 or microphone input terminal 21, the audio signal is amplified by the microphone amplifier 22 and then, the audio signal is subjected to automatic gain control by the AGC circuit 23. The audio signal controlled in gain is amplified by the electronic volume 24 and the amplified audio signal is converted to digital data by the A/D converter 14b. The digital audio data converted by the A/D converter 14b is stored in the buffer RAM 12 temporarily and then, the audio data is read out at a predetermined recording rate by the memory controller 10. As described later, reading of data from the buffer RAM 12 is so controlled to be carried out intermittently corresponding to the spindle servo and memory capacity.

The audio data read out from the buffer RAM 12 through the memory controller 10 is subjected to such processings as EFM encoding, error correction encoding or the like. Then, the data is subjected to magnetic modulation by the magnetic head driver 6 according to audio data which is a main data and photomagnetically recorded in the photomagnetic disc 1 which is irradiated with write power laser beam from the optical pickup 3 by the magnetic head 6a. Here, the write power laser beam is relatively high level laser output for heating the recording track up to a Curie Temperature.

Data transmission from reading from the buffer RAM 12 to here is carried out by controlling a rotation of the spindle motor 2 according to a drive signal from the digital servo circuit 9. consequently, contrary to reproduction, for example, write into the buffer RAM 12 is carried out continuously, while reading from the buffer RAM 12 is carried out intermittently at a high speed rate.

An intermittent operation for data reading from the buffer RAM for recording according to this embodiment will be described with reference to a flow chart of FIG. 8 and a timing chart of FIG. 9.

Referring to FIG. 8, a processing for recording operation is started in step S21. More specifically, if audio signal is inputted through the light/line input terminal 20 or microphone input terminal 21, the audio signal is amplified by the microphone amplifier 22 and then, the audio signal is subjected to automatic gain control by the AGC circuit 23. Next, the audio signal controlled in gain is amplified by the electronic volume 24 and the amplified audio signal is converted to digital data by the A/D converter 14b.

In step S22, the spindle servo is turned on so as to start the servo. More specifically, at time T21, the digital servo circuit 9 generates a drive signal for turning on the spindle servo according to the rotation speed detection information of the spindle motor 2 supplied from the system controller 11 and supplies it to the servo driver 8, for example, as the PWM signal. The servo driver 8 supplies an electric power corresponding to the PWM signal as the spindle error signal to the motor driver 13. The motor driver 13 generates a drive signal based on the spindle error signal and starts servo control on the spindle motor speed. In this case, the spindle motor is so controlled to rotate at a higher speed than normal mode.

In step S23, data write into the memory is started. More specifically, at time T21, the system controller 11 sends a signal for control of data write by the memory controller 10 into the buffer RAM 12. Based on this control signal, the memory controller 10 executes data write into the buffer RAM 12.

In step S24, whether or not the memory capacity is 40% is determined. More specifically, at time T22 (T26, T30), the memory controller recognizes that the memory capacity of the system controller 11 is over 40% according to an address number or a write pointer position at which data write into the buffer RAM 12 corresponding to an address number of maximum memory capacity was carried out.

If in step S24, the memory capacity is more than 40%, the processing proceeds to step S25. In step S25, data stored in the memory is written into a disc. More specifically, audio data read out from the buffer RAM 12 through the memory controller 10 is subjected to such processings as EFM encoding and error correction encoding at the signal processing portion 10a. Next, the data is subjected to magnetic modulation by the magnetic head driver 6 according to audio data which is its main data. Photomagnetic recording is carried out to a recording track heated to Curie Temperature by irradiating the photomagnetic disc 1 with write power laser beam by the optical pickup 2, through the magnetic head 6a.

In step S26, whether or not the memory capacity is less than 20% is determined. More specifically, at time T23(T27, T31), the memory controller 10 recognizes that the memory capacity of the system controller 11 is less than 20% according to an address number or a read pointer position at which data read into the buffer RAM 12 corresponding to an address number of maximum memory capacity was carried out.

If in step S26, the memory capacity is less than 20%, the processing proceeds to step S27. In step S27, the spindle servo is turned off (stopped). More specifically, at time T23 (T27, T31), the digital servo circuit 9 stops a drive signal for turning off the spindle servo according to the rotation speed detection information of the spindle motor 2 supplied from the system controller 11. The servo driver 8 stops a supply of electric power to the motor driver 13 corresponding to the PWM signal as the spindle error signal. The motor driver 13 stops a drive signal based on the spindle error signal so as to stop the servo control on the spindle motor. In this case, the spindle motor 2 is so controlled to rotate through inertia at a rotation speed slightly lower than a high speed rotation until time T23–T25(T27–T29).

In step S28, whether or not the memory capacity is empty or minimum is determined. More specifically, at time T24 (T28, T32), the memory controller 10 recognizes that the memory capacity of the system controller 11 is empty according to an address number or read-out pointer at which data readout to the buffer RAM 12 corresponding to an address number of maximum storage capacity was carried out.

If in step 28, the memory capacity is empty, the processing proceeds to step S29. In step S29, data write into the disc is stopped. More specifically, at time T24(T28, T32), because there is no audio data to be read out from the buffer RAM 12 through the memory controller 10, no EFM encoding, error correction encoding or the like is carried out at the signal processing portion 10a. No magnetic modulation is carried out by the magnetic driver 6 at a subsequent stage. Further, because the photomagnetic disc 1 is not irradiated with write power laser beam by the optical pickup 2, no photomagnetic recording is carried out on any recording track by the magnetic head 6a.

In step S30, whether or not the memory capacity is more than 30% is determined. More specifically, at time T25 (T29), the memory controller 10 recognizes that the memory capacity of the system controller 11 is more than 30% according to an address number or write pointer at which data write into the buffer RAM 12 corresponding to an address number of maximum storage capacity was carried out.

If in step S30, the memory capacity is more than 30%, the processing proceeds to step S31. In step S31, the spindle servo is turned on so as to restart the servo. More specifically, at time T25 (T29), the digital servo circuit 9 turns on the spindle servo according to the rotation speed detection information of the spindle motor 2 supplied from the system controller 11 and generates a drive signal for restarting the servo supplied it to the servo driver 8 and for example as, the PWM signal. The servo driver 8 supplies an electric power corresponding to the PWM signal as a spindle error signal to the motor driver 13. The motor driver 13 turns on the spindle servo based on the spindle error signal and generates a drive signal for restarting the servo so as to start the servo control on the speed of the spindle motor. In this case, in a period from time T25 to T27, the spindle motor 2 is so controlled to rotate at a speed higher than a rotation speed by inertial force in the period from time T23 to T25 (T27–T29). After that, the processing returns to step 24 and the processing and determination from step S24 to step S31 are repeated until the recording operation is finished.

Because the operations at time T26–T32 are the same as the above described steps S24–S31, corresponding processing and determination are described in the parentheses.

After the spindle motor 2 is accelerated, data write is started at some rotation speed and then, even if the acceleration is stopped, the spindle motor 2 remains rotating due to inertia. Thus, data recording into the photomagnetic disc is possible by variable speed recording in a period in which the spindle motor 2 is rotating by inertia also. Thus, it is so controlled that data writing time is reduced and reading from the buffer RAM 12 is continued during the inertial rotation as well and then the reading from the buffer RAM 12 and data recording into the photomagnetic disc are stopped slightly later than when the acceleration is stopped. Meanwhile, some rotation speed refers to a speed in which data can be recorded effectively for a short time.

As described above, during the intermittent operation for recording, it is so controlled that data stored in the buffer RAM 12 is recorded all at once and if data increases from its empty state, the spindle motor 2 is accelerated, and when the rotation speed becomes the fastest, data is read out from the buffer RAM 12 and then the data is recorded into the photomagnetic disc. By repeating this procedure, an interruption of reproduction data due to vibration is prevented so as to achieve energy saving.

The reproducing apparatus of this embodiment comprises the optical pickup 3 which is a reproducing means for reproducing digital data recorded in the photomagnetic disc 1 which is a disc like recording medium, the buffer RAM 12 which is a memory means for storing digital data reproduced by the reproducing means, the memory controller 10 which is a memory control means for reading digital data stored in the memory means at a first speed and writing digital data reproduced by the reproducing means into the memory means intermittently at a speed higher than the first speed, the spindle motor 2 which is a rotating means for rotating the disc like recording medium, and the system controller 11 which is a control means for after the memory control means stops write of digital data reproduced by the reproducing means into the memory means, at least making the rotating means rotate through inertia and when the memory control means restarts write of digital data reproduced by the reproducing means into the memory means, restarting the write into the memory means after rotation of the rotating means is restarted. Thus, the rotating means is rotated first and when the rotation speed reaches a some degree of speed, write into the memory means is started. Acceleration of the rotating means is stopped before the memory capacity of the memory means is full and then, write is carried out during an inertial rotation of the rotating means so as to achieve intermittent operation. Consequently, by combining power consumption during the operation with power consumption during the intermittent operation, consumption of electric power is reduced. As a result, the structure of the apparatus can be reduced in size and weight. Further, this is optimal for a portable type apparatus driven by batteries. Because high speed reading is enabled when the rotation speed of the rotating means is high, an access speed to the recording medium in anti-vibration state can be improved and further, effective use of energy can be achieved.

In the reproducing apparatus of this embodiment, as described above, either when the memory controller 10 which is the memory control means controls to start or stop write of digital data reproduced by the optical pickup 3 which is the reproducing means into the buffer RAM 12 which is the memory means, the system controller 11 which is the control means rotates the spindle motor 2 which is a rotating means through inertia and starts or stops write into the memory means. Thus, by deviating the timing of the rotating operation of the rotating means with respect to the timing for either start or stop of the write into the memory means or both of them, the intermittent operation is achieved so as to reduce total power consumption.

The recording apparatus of this embodiment comprises the buffer RAM 12 which is the memory means for accumulating inputted digital data temporarily, the memory controller 10 which is the memory control means for writing digital data stored in the memory means at a fixed speed and reading the digital data stored in the memory means intermittently at a speed higher than the fixed speed, the spindle motor 2 which is the rotating means for rotating the photomagnetic disc 1 which is a disc like recording medium, the magnetic head 6a which is a recording means for recording digital data read intermittently from the memory means into the disc like recording medium, and the system controller 11 which is the control means for after the memory control means stops reading of digital data from the memory means, at least making the rotating means rotate through inertia and when the memory control means restarts reading of digital data from the memory means, restarting the rotation of the rotating means and then restarting the reading to the memory means. Thus, the rotating means is rotated first and when the rotation speed reaches some degree of speed, reading from the memory means is started and before the memory capacity of the memory means is empty, the acceleration of the rotating means is stopped and during an inertial rotation thereof, write into the disc like recording medium is carried out so as to achieve the intermittent operation. Consequently, by combining power consumption during the operation with power consumption during the intermittent operation, total power consumption is reduced. As a result, the structure of the apparatus can be reduced in size and weight. Further, this is optimal for a portable apparatus driven by batteries. Because quick write is enabled when the rotation speed of the rotating means is high, the access speed to the recording medium in anti-vibration state can be improved and further, effective use of energy can be achieved.

Although in this embodiment described above, a case in which the photomagnetic disc 1 as the disc like recording medium is MO is indicated, other optical disc, for example, mini disc (MD), phase change recording type digital versatile disc (DVD), rewritable CD-R or CR-R/W and the like is permitted. Further, for only reproduction, optical disc CD, CD-ROM and the like are also permitted.

The reproducing apparatus of the present invention comprises the reproducing means for reproducing digital data recorded in the disc like recording medium, the memory means for storing digital data reproduced by the reproducing means, the memory control means for reading digital data stored in the memory means at a first speed and writing digital data reproduced by the reproducing means into the memory means intermittently at a speed higher than the first speed, the rotating means for rotating the disc like recording medium, and the control means for after the memory control means stops write of digital data reproduced by the reproducing means into the memory means, at least making the rotating means rotate through inertia and when the memory control means restarts write of digital data reproduced by the reproducing means into the memory means, restarting the write into the memory means after rotation of the rotating means is restarted. Thus, the rotating means is rotated first and when the rotation speed reaches a some degree of speed, write into the memory means is started. Acceleration of the rotating means is stopped before the memory capacity of the memory means is full and then, write is carried out during an inertial rotation of the rotating means so as to achieve intermittent operation. Consequently, by combining power consumption during the operation with power consumption during the intermittent operation, consumption of electric power is reduced. As a result, the structure of the apparatus can be reduced in size and weight. Further, this is optimal for a portable type apparatus driven by batteries. Because high speed reading is enabled when the rotation speed of the rotating means is high, an access speed to the recording medium in anti-vibration state can be improved and further, effective use of energy can be achieved.

In the reproducing apparatus of the present invention, as described above, either when the memory control means starts or stops write of digital data reproduced by the reproducing means into the memory means, the control means rotates the rotating means through inertia and starts or stops write into the memory means. Thus, by deviating the timing of the rotating operation of the rotating means with respect to the timing for either start or stop of the write into the memory means or both of them, the intermittent operation is achieved so as to reduce total power consumption.

The recording apparatus of the present invention comprises the memory means for accumulating inputted digital data temporarily, the memory control means for writing digital data stored in the memory means at a fixed speed and reading the digital data stored in the memory means intermittently at a speed higher than the fixed speed, the rotating means for rotating the disc like recording medium, the recording means for recording digital data read intermittently from the memory means into the disc like recording medium, and the control means for after the memory control means stops reading of digital data from the memory means, at least making the rotating means rotate through inertia and when the memory control means restarts reading of digital data from the memory means, restarting the rotation of the rotating means and then restarting the reading to the memory means. Thus, the rotating means is rotated first and when the rotation speed reaches some degree of speed, reading from the memory means is started and before the memory capacity of the memory means is empty, the acceleration of the rotating means is stopped and during an inertial rotation thereof, write into the disc like recording medium is carried out so as to achieve the intermittent operation. Consequently, by combining power consumption during the operation with power consumption during the intermittent operation, total power consumption is reduced. As a result, the structure of the apparatus can be reduced in size and weight. Further, this is optimal for a portable apparatus driven by batteries. Because quick write is enabled when the rotation speed of the rotating means is high, the access speed to the recording medium in anti-vibration state can be improved and further, effective use of energy can be achieved.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A reproducing apparatus for reproducing by reading data from a recording medium, comprising:

a driving means for rotating said recording medium;

a reproducing means for reproducing data from said recording medium;

a memory means for temporarily memorizing data reproduced by said reproducing means;

a memory capacity detecting means for detecting the memory capacity of the data memorized in said memory means;

a memory control means for reading data memorized in said memory means at a first speed and intermittently memorizing data reproduced by said reproducing means in said memory means at a second speed higher than said first speed;

means for controlling said driving means so as to interrupt a drive of said recording medium by said driving means after the memory capacity of the data memorized reaches a first predetermined amount and before a storage capacity of a memory reaches a second predetermined amount;

means for controlling said reproducing means to reproduce data from said recording medium at least during an inertial rotation of said recording medium after the drive of said recording medium is interrupted;

means for controlling said memory control means to continue to memorize said data in said memory means after said first predetermined amount is reached; and means for controlling said memory control means so as to interrupt the memorization of said data by said memory means after the memory capacity reaches a second predetermined amount.

2. The reproducing apparatus according to claim 1, wherein said control means controls said driving means to rotate said recording medium at a predetermined speed if the memory capacity of the data memorized in said memory means is below a third predetermined amount, and controls said reproducing means to reproduce data from said recording medium and controls said memory control means to memorize the data in said memory means if the memory capacity of the data memorized in said memory means is below said second predetermined amount.

3. The reproducing apparatus according to claim 1, further comprising:

a reference signal generating means for generating a reference signal which enables said reproducing means to reproduce data after the drive of said recording medium is interrupted also, wherein said reference signal generating means includes:

a first oscillating means for oscillating at a frequency based on a given error signal;

a second oscillating means for oscillating at a predetermined frequency;

a drive control signal generating means for generating a signal for controlling a driving speed of said driving means based on the reference signal outputted by said first oscillating means and said second oscillating means; and an oscillation control means for controlling said first oscillating means by detecting a drive speed of said recording medium and generating an-error signal relative to a predetermined value.

4. A recording apparatus for recording data in a recording medium, comprising:

a driving means for rotating said recording medium;

a recording means for recording data in said recording medium;

a memory means for memorizing data to be recorded in said recording medium by said recording means temporarily;

a memory control means for writing data to be recorded in said recording medium into said memory means at a first speed and reading data to be recorded in said recording medium intermittently at a second speed higher than said first speed from said memory means;

means for controlling said memory control means after the memory capacity of the data memorized in said memory means reaches a first predetermined amount so as to read out data from said memory means and to record said data into said recording medium;

means for controlling said driving means after the memory capacity of said memory means reaches a second predetermined amount so as to interrupt a rotational drive of said recording medium by said driving means; and means for controlling said recording means after the memory capacity of said memory means reaches a third predetermined amount at least during an inertial rotation of said recording medium so as to interrupt a recording said data into said recording medium.

5. The recording apparatus according to claim 4, further comprising:

reference signal generating means for generating a reference signal which enables said recording means to write data after the drive of said recording medium is interrupted also, wherein said reference signal generating means includes:

a first oscillating means for oscillating at a frequency based on a given error signal;

a second oscillating means for oscillating at a predetermined frequency;

a drive control signal generating means for generating a signal for controlling a driving speed of said driving means based on the reference signal outputted by said first oscillating means and said second oscillating means; and an oscillation control means for controlling said first oscillating means by detecting a drive speed of said recording medium and generating an error signal relative to a predetermined value.

6. A reproducing method for reproducing data recorded in a recording medium, comprising steps of:

controlling a recording medium to rotate;

reading data from said recording medium at a first speed to memorize the data temporarily;

fetching out said data memorized temporarily at a second speed lower than said first speed for reproduction;

interrupting a control on the rotation of said recording medium if data read from said recording medium exceeds a first predetermined amount of the memory capacity temporarily memorized; and reading data from said recording medium intermittently at a third speed during an inertial rotation of said recording medium to memorize the data temporarily and fetching out said data memorized temporarily at a second speed lower than said third speed for reproduction.

7. The reproducing method according to claim 6, further comprising a step of:

interrupting a reading of data from said recording medium if data read from said recording medium exceeds a second predetermined amount of the memory capacity temporarily memorized during an inertial rotation of said recording medium.

8. The reproducing method according to claim 7, further comprising steps of, subsequent to the step of interrupting a reading of the data:

controlling said recording medium to be rotated if the memory capacity of said data temporarily memorized reaches a third predetermined amount; and reading data from said recording medium and storing it temporarily.

9. A recording method for recording data in a recording medium, comprising steps of:

controlling a recording medium to rotate;

storing data to be recorded in said recording medium temporarily until a predetermined amount of data is stored;

writing the data stored temporarily into said recording medium if the stored data reaches the predetermined amount;

interrupting a control of the rotation of said recording medium if the stored data reaches the predetermined amount; and recording the data stored temporarily into said recording medium at least during an inertial rotation of said recording medium after the control on the rotation of said recording medium is interrupted.

10. The recording method according to claim 9, further comprising a step of:

storing said data stored temporarily at a first speed and writing said data into said recording medium intermittently at a second speed higher than said first speed.

11. The recording method according to claim 9, wherein the interruption of the control on the rotation of said recording medium is executed when the amount of the data stored temporarily is below a predetermined amount.

12. The recording method according to claim 10, wherein in the step for recording data during the inertial rotation of said recording medium comprises:

interrupting the recording into said recording medium when the data stored temporarily is vanished.

* * * * *

UNITED STATES PATENT AND TRADEMARK OFFICE
CERTIFICATE OF CORRECTION

PATENT NO. : 6,839,309 B1
DATED : January 4, 2005
INVENTOR(S) : Hiromoto Yunoki et al.

It is certified that error appears in the above-identified patent and that said Letters Patent is hereby corrected as shown below:

<u>Title page,</u>
Item [75], Inventors, after "Atsushi Amano, Kanagawa (JP)" please add
-- Satoru Kanou, Kanagawa (JP) --.

Signed and Sealed this

Thirty-first Day of May, 2005

JON W. DUDAS
*Director of the United States Patent and Trademark Office*